(12) United States Patent
Fukui et al.

(10) Patent No.: US 9,493,111 B2
(45) Date of Patent: Nov. 15, 2016

(54) LAMP UNIT

(75) Inventors: Hirotaka Fukui, Kiyosu (JP); Tadaoki Ichikawa, Kiyosu (JP); Satoshi Inagaki, Kiyosu (JP)

(73) Assignee: TOYODA GOSEI CO., LTD., Kiyosu-Shi, Aichi-Ken (JP)

( * ) Notice: Subject to any disclaimer, the term of this patent is extended or adjusted under 35 U.S.C. 154(b) by 999 days.

(21) Appl. No.: 13/421,755

(22) Filed: Mar. 15, 2012

(65) Prior Publication Data

US 2012/0243239 A1  Sep. 27, 2012

(30) Foreign Application Priority Data

Mar. 23, 2011 (JP) ................. 2011-064251

(51) Int. Cl.
*F21V 3/00* (2015.01)
*B60Q 3/02* (2006.01)

(52) U.S. Cl.
CPC ........... *B60Q 3/0286* (2013.01); *B60Q 3/0296* (2013.01)

(58) Field of Classification Search
USPC .................. 362/235, 249.01, 249.02, 311.01, 362/311.02, 311.14, 326, 335, 351, 355, 362/800
See application file for complete search history.

(56) References Cited

U.S. PATENT DOCUMENTS

| | | | |
|---|---|---|---|
| 2010/0214799 A1* | 8/2010 | Ohmi et al. | 362/545 |
| 2010/0296265 A1 | 11/2010 | Kim et al. | |
| 2010/0309660 A1 | 12/2010 | Lim et al. | |
| 2011/0188244 A1 | 8/2011 | Hong et al. | |
| 2011/0205743 A1 | 8/2011 | Lim et al. | |
| 2013/0128586 A1 | 5/2013 | Lim et al. | |

FOREIGN PATENT DOCUMENTS

| | | |
|---|---|---|
| CN | 101349388 A | 1/2009 |
| CN | 201259102 Y | 6/2009 |
| CN | 101929651 A | 12/2010 |
| JP | 2007-035788 A | 2/2007 |

OTHER PUBLICATIONS

Chinese First Office Action, dated Dec. 23, 2013, with English translation.

* cited by examiner

*Primary Examiner* — Andrew Coughlin
*Assistant Examiner* — Meghan Ulanday
(74) *Attorney, Agent, or Firm* — McGinn IP Law Group, PLLC

(57) ABSTRACT

A lamp unit, comprises a substrate on which a luminous element is mounted, a housing having an opening in which the luminous element is arranged, and a lens arranged at a light emitting side of the luminous element, wherein the housing is sandwiched and fixed between the substrate and the lens; and wherein the lens is provided with a first wall portion protruding from a side of the lens facing the housing and surrounding the opening of the housing, and the housing is provided with a second wall portion protruding from a side of the housing facing the substrate and surrounding the opening of the housing.

4 Claims, 5 Drawing Sheets

LAMP UNIT

BACKGROUND OF THE INVENTION

1. Field of the Invention

The present invention relates to a lamp unit.

2. Description of the Related Art

A related lamp unit employing a luminous element such as LED and the like has been so constructed that the luminous element is mounted on a substrate, a lens is arranged at a light emitting side of the luminous element, the lens and substrate are covered by a housing and the lens is exposed from an opening (see Patent Document 1).

Patent Document 1: JP-A-2007-35788

In the related lamp unit, since there is concern about an invasion of foreign substances such as dust and the like into the housing through the opening, there has been a problem that the foreign substances are attached to a rear face side of the lens or the luminous element thereby lowering intensity of illumination, or a problem that the foreign substances attached to the rear face side of the lens or the luminous element are viewed from the outside thereof thereby lowering appearance quality thereof.

Particularly, such problems frequently appear in a lamp unit which is used as a map lamp installed on a roof portion (ceiling portion) of a vehicle interior because the foreign substances easily invade the housing through the opening of the housing.

SUMMARY OF THE INVENTION

The present invention has been made in an effort to solve the above problems, and an object of the present invention is to provide a lamp unit capable of preventing the degree of accuracy in the lighting and the appearance quality from being lowered by an invasion of foreign substances.

As a result of repeatedly reviewing the above problems to solve them, each aspect of the present invention has been provided as follows.

<A First Aspect>

A first aspect of the invention provides with a lamp unit, comprising a substrate on which a luminous element is mounted, a housing having an opening in which the luminous element is arranged, and a lens arranged at a light emitting side of the luminous element, wherein the housing is sandwiched and fixed between the substrate and the lens, and wherein the lens is provided with a first wall portion protruding from a side of the lens facing the housing and surrounding the opening of the housing, and the housing is provided with a second wall portion protruding from a side of the housing facing the substrate and surrounding the opening of the housing.

According to the first aspect, the housing such as the above-described conventional structure (the structure in which a substrate and a lens are covered by a housing having an opening and the lens is exposed through the opening) is unnecessary. A luminous element is received inside a receiving space surrounded by a first wall portion, a second wall portion, a lens and a substrate. A housing is sandwiched between the substrate and lens to be fixed, thereby the first wall portions and housing are in contact with each other, and at the same time, the second wall portion and the substrate come into contact with each other, so that the contact portions thereof are adhered to each other without any gap there-between. For this reason, an invasion of foreign substances into the receiving space of the luminous element from the outside of the lamp unit may accurately be prevented. As a result, according to the first aspect, the problem that foreign substances are attached to the luminous element or the rear side of the lens thereby lowering the degree of accuracy in the lighting or the problem that foreign substances attached to the luminous element or the rear face side of the lens are viewed from the outside thereby lowering the appearance quality can be solved.

<A Second Aspect>

In a lamp unit of a second aspect according to the first aspect, the first wall portion of the lens is arranged more outside than the second wall portion of the housing.

Though the luminous element emits light towards a lens side in a radial shape, since the first wall portion is arranged at the outer side than the second wall portion, there is no concern that the light emission of the luminous element is hindered by the first and second wall portions thereby enhancing efficiency of light emission.

<A Third Aspect>

In a lamp unit of a third aspect according to the second aspect, the lamp comprises a first attachment hole penetration-formed in the housing, a second attachment hole penetration-formed in the substrate, and a fixing member protruding from a side of the lens facing the housing, wherein the fixing member is inserted into the second attachment hole from the first attachment hole of the housing, and the fixing member, the first attachment hole and the second attachment hole are arranged more outside than the first wall portion of the lens.

According to the third aspect, the fixing member is arranged at an outside of the receiving space of the luminous element thereby the action and effect according to the first aspect are not hindered by the fixing member.

Since it is possible that the housing is sandwiched and fixed between the substrate and the lens by the fixing member without using a separate member such as a screw and the like to thereby be fixed, if the fixing member and the lens are formed in one body, the cost of parts may be reduced thereby realizing a low cost thereof.

<A Fourth Aspect>

In a lamp unit of a fourth aspect according to the third aspect, a wall portion for reinforcement which connects the first wall portion and the fixing member are provided.

For this reason, stiffness of lens is enhanced by the wall portion for reinforcement thereby preventing any change in the lens, thereby preventing the action and effect according to the first aspect from being hindered.

<A Fifth Aspect>

In a lamp unit of a fifth aspect according to the third aspect, wherein a front end portion of the fixing member protrudes from the second attachment hole of the substrate, the lens is fixed with respect to the substrate by applying heat-coking on front and portions of the fixing members so that the housing is sandwiched and fixed between the substrate and the lens.

The wall portion of the lens is arranged more outside than the wall portion of the housing (first aspect), and the fixing members and attachment holes are arranged more outside than the wall portion of the lens (third aspect).

For this reason, when the fixing members are supplied with heat for coking, by the principle of a lever having a base portion of the fixing members as a dynamic point, the second wall portion as a supporting point, and the first wall portion as an action point, a force pressing the first wall portion towards the housing is acted thereby enhancing a close adhesion between the first wall portion and the housing and at the same time a close adhesion between the second wall portion and the substrate.

Furthermore, by the position relationships between the fixing members, the first wall portion and the second wall portion, a force causing the fixing members to be bent in an inside direction of the lens (a direction of optical axis) is acted thereby further enhancing a close adhesion there-between.

Since the lens is provided with a wall portion for reinforcement (fourth aspect), an excessive deformation in the whole lens may be prevented even though a force causing the fixing members to be bent inward the lens is acted.

<A Sixth Aspect>

In a lamp unit of a sixth aspect according to the first aspect, a part of surface of the lens from which light is emitted is performed with a light diffusion processing.

As a result, according to the fifth aspect, the action and effect according to the first aspect can accurately be obtained. For this reason, an optical diffusion processing serves to reduce unevenness in color of light emitted from a surface of the lens, thereby enhancing the degree of accuracy in the lighting.

DETAILED DESCRIPTION OF THE PREFERRED EMBODIMENTS

Figure 1:
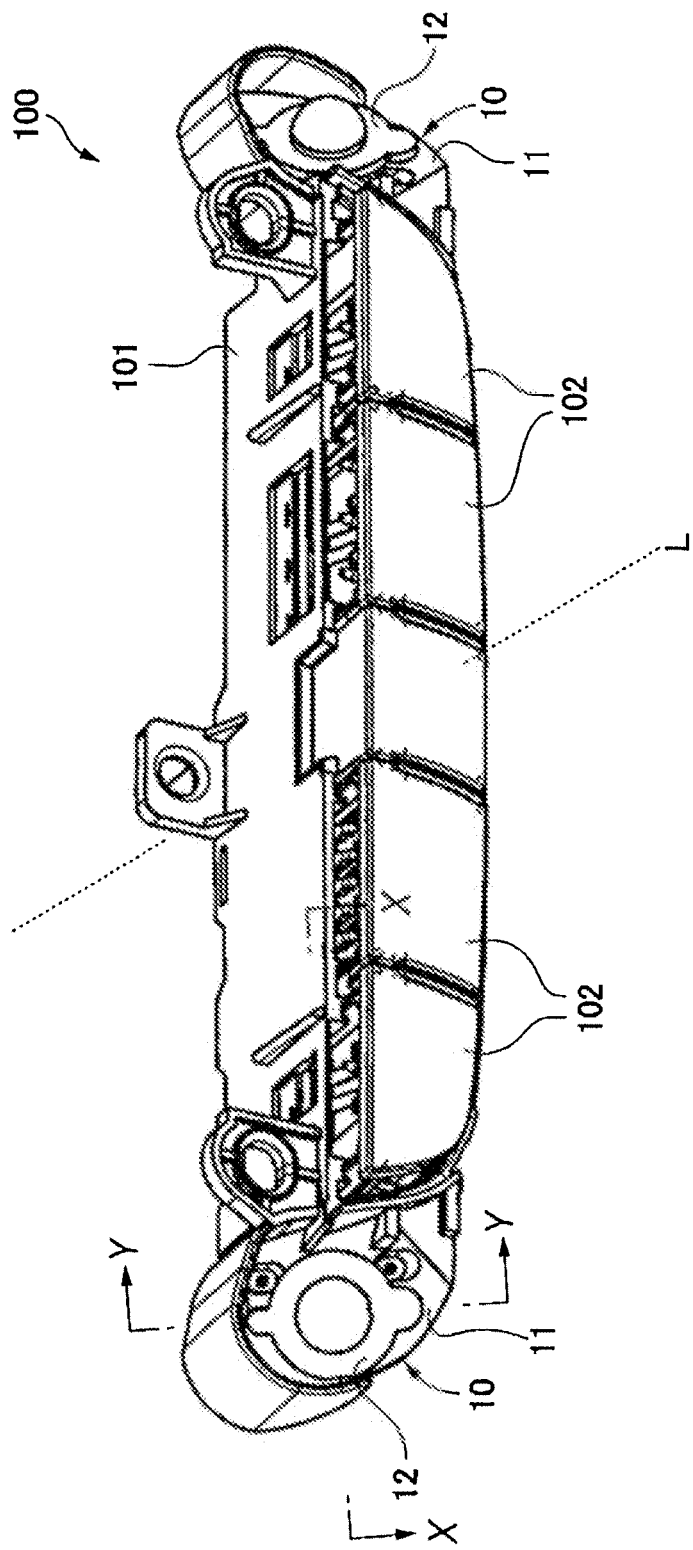
FIG. 1 is a front side perspective view showing a map lamp combined switch apparatus 100 provided with a lamp unit 10 according to a preferred embodiment of the present invention.

Hereinafter, the lamp unit 10 according to the preferred embodiment of the present invention will be explained with reference to FIGS. 1 to 6.

The lamp unit 10 includes a housing 11 (opening 11a, attachment holes 11b, 11c, wall portion 11d, protrusions 11e to 11j), lens 12 (lens body 12a, flange 12b, fixing members 12c, 12d, wall portions 12e to 12g, surface 12h), substrate 13 (attachment holes 13a, 13b), luminous element 14, etc.

Figure 2:
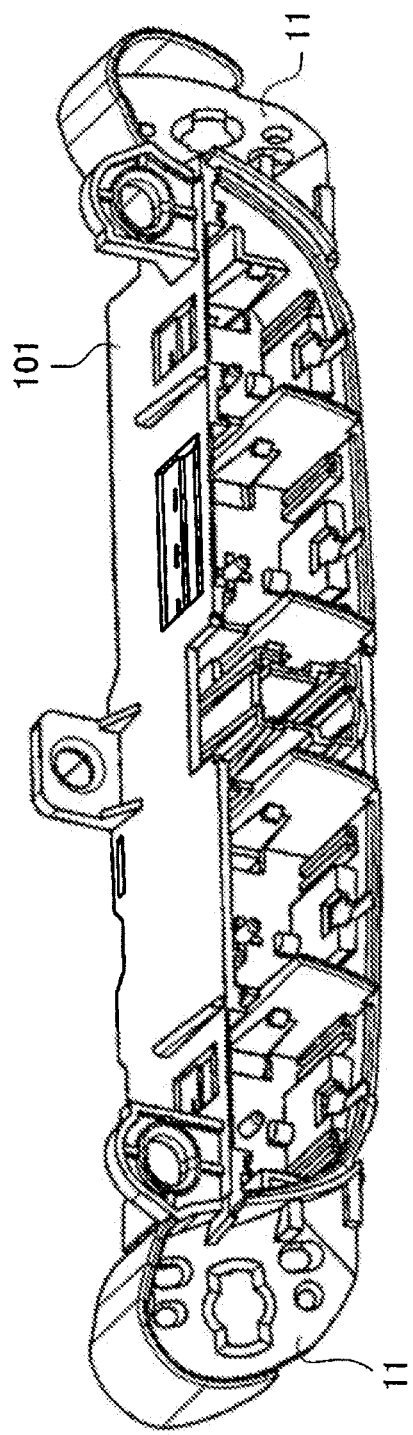
FIG. 2 is a front side perspective view showing a housing 101 of the map lamp combined switch apparatus 100 formed integrally with the housing 11 of the lamp unit 10.

As shown in FIGS. 1 and 2, the map lamp combined switch apparatus 100 is formed in an evenly long side-ways shape, and installed on an interior roof of a vehicle so that a lengthwise direction of the map lamp combined switch apparatus 100 may coincide with a transverse direction of a vehicle.

As shown in FIG. 1, the map lamp combined switch apparatus 100 is provided at both ends thereof with the lamp unit 10 forming a map lamp, and five switches 102 for controlling each part of a vehicle such as the lamp unit 10 are arranged in a line of transverse direction between the two lamp units 10.

The lamp unit 10 installed at both ends of the map lamp combined switch apparatus 100 is formed in a line symmetry shape with respect to the central line L dividing the map lamp combined switch apparatus 100 into two parts in a lengthwise direction.

Though the lamp unit 10 installed at a left end of the map lamp combined switch apparatus 100 will be described hereinafter, the lamp unit 10 installed on a right end thereof also has the same structure as that installed on a left end thereof.

As shown in FIGS. 1 and 2, the housing 101 of the map lamp combined switch apparatus 100 is formed in a body by injection molding of a synthetic resin, and the housing 11 of the lamp unit 10 is formed in a body with the housing 101.

Figure 3:
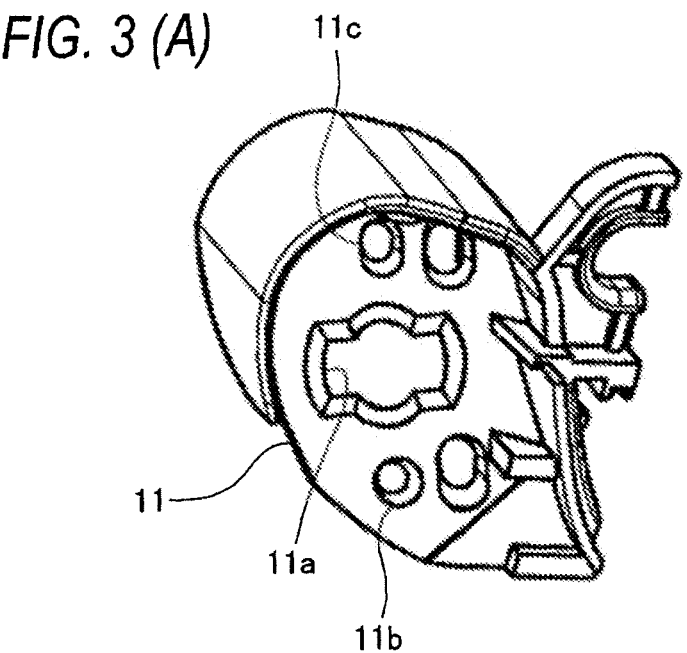
FIG. 3(A) is a front side perspective view showing the housing 11 of the lamp unit 10.
FIG. 3(B) is a rear side perspective view showing the housing 11 of the lamp unit 10.
Figure 3:
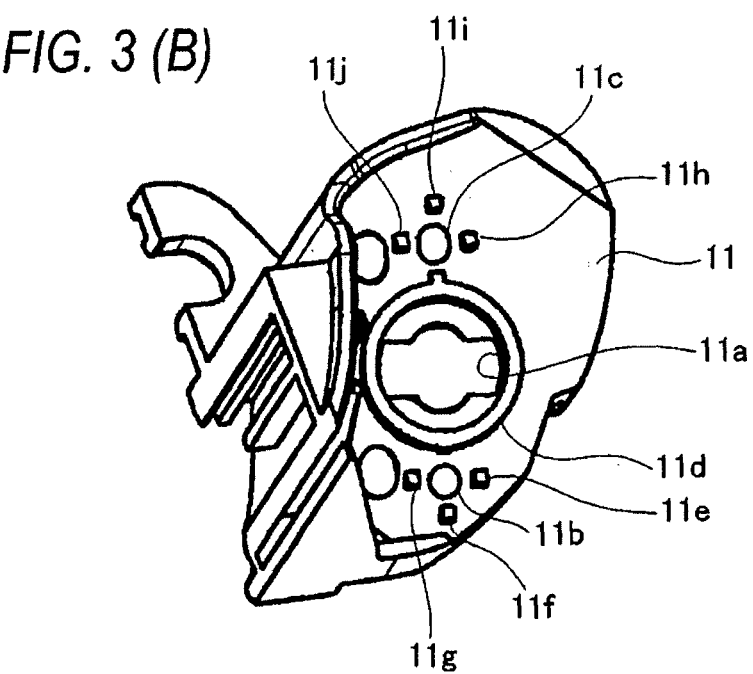
Figure 4:
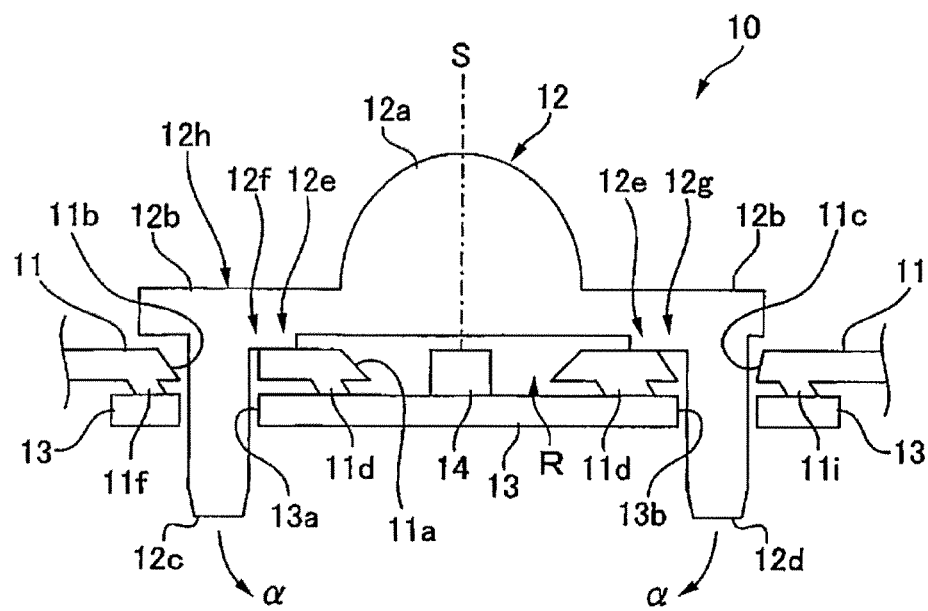
FIG. 4 is a schematic vertical section showing the lamp unit 10 taken along Y-Y line shown in FIG. 1.
Figure 5:
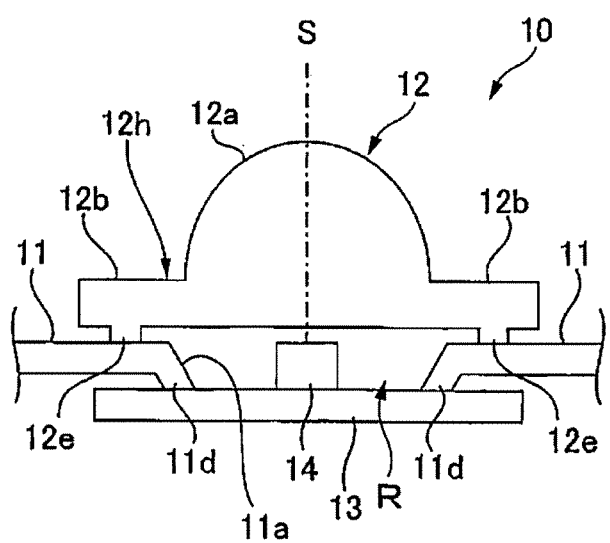
FIG. 5 is a schematic vertical section showing the lamp unit 10 taken along X-X line shown in FIG. 1.

As shown in FIGS. 3 to 5, a main portion (lens 12 and attachment portion of substrate 13) of the housing 11 is formed in an approximately plan shape, and formed thereon with the opening 11a and the attachment holes 11b, 11c passing there-through.

The circle shaped attachment holes 11b, 11c are arranged on a line dividing the opening 11a in a vertical direction with the opening 11a interposed there-between.

As shown in FIGS. 3(B) to 5, the housing 11 is formed on a rear face side (the other side) thereof with the wall portion (rib) 11d and the protrusions 11e to 11j protruding from the rear face side.

The ring shaped wall portion 11d is arranged to surround the opening 11a.

The cylinder shaped protrusions 11e to 11g are arranged at intervals to surround the attachment hole 11b.

The cylinder shaped protrusions 11h to 11j are arranged at intervals to surround the attachment hole 11c.

The wall portion 11d and the protrusions 11e to 11j are approximately diamond-shaped when viewed from a longitudinal cross sectional side. The upper faces of the wall portion 11d and the protrusions 11e to 11j are positioned on the same plan.

Incidentally, the reason the wall portion 11d and the protrusions 11e to 11j are approximately diamond-shaped in a longitudinal cross sectional side thereof is that molds for injection molding of the housing 11 are separated in an oblique direction.

Figure 6:
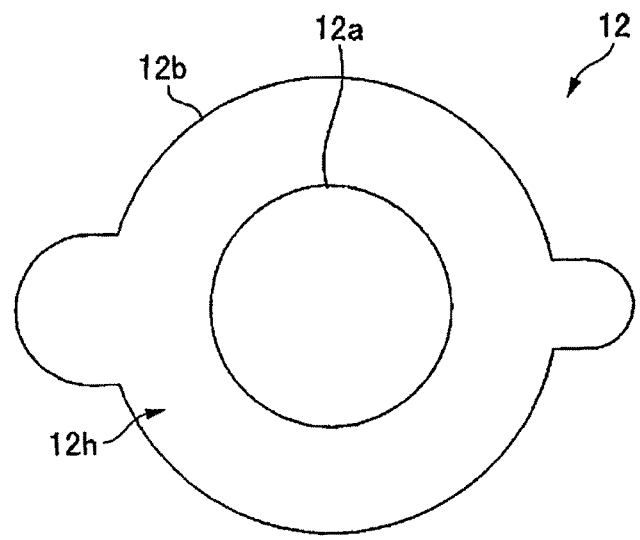
FIG. 6(A) is a top view showing the lens 12 of the lamp unit 10 and FIG. 6(B) is a bottom view showing the lens 12 of the lamp unit 10.
Figure 6:
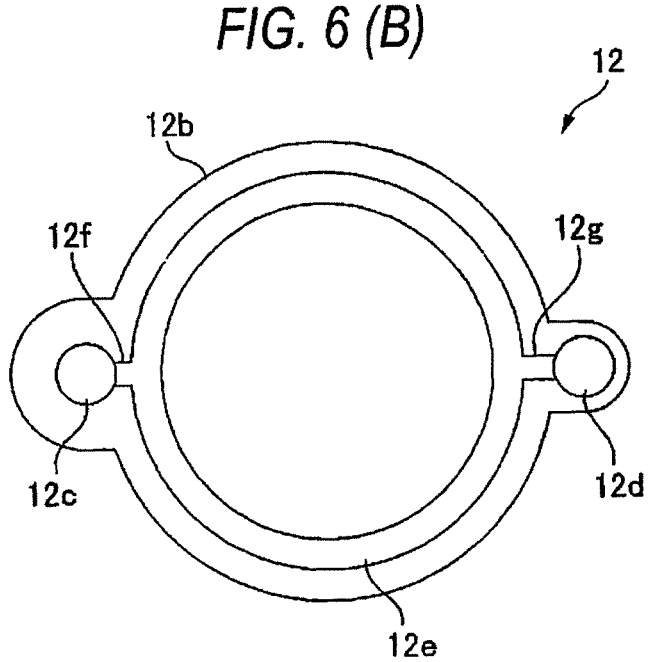

As shown in FIGS. 4 to 6, the lens 12 is formed of the lens body 12a, flange 12b, fixing members 12c, 12d, and wall portion 12e to 12g, and formed in a body by injection molding of a transparent synthetic resin having thermoplastic characteristics.

The lens body 12a of convex lens is formed in an approximately semispherical shape with a bottom face thereof flattened, and the approximately flattened flange 12b is connected with a circumferential edge of a bottom side of the lens body 12a.

At the rear side (at an opposite side of the protruding direction of the lens body 12a) of the flange 12b, the approximately cylinder shaped fixing members 12c, 12d are formed in a protruded shape towards the outside of the lens body 12a when viewed on a line dividing the lens body 12a into two parts in a longitudinal direction.

At the rear side of the flange 12b, the ring shaped wall portion 12e is arranged to surround the lens body 12a.

The inside diameter of the wall portion 12e of the lens 12 is larger than the outer diameter of the wall portion 12d of the housing 11.

The wall portions 12e to 12g serve to connect the wall portion 12e to the fixing members 12c, 12d, respectively.

The cross sectional shape of the wall portions 12e to 12g is formed in an approximately rectangular shape, and the upper faces of the wall portions 12e to 12g are positioned on a same plan.

A light diffusion processing has been performed on the surface (surfaces of the lens body 12a and flange 12b) 12h of the lens 12.

As shown in FIGS. 4 and 5, the substrate (printed circuit board) 13 is formed therein with the attachment holes 13a, 13b passing there-through.

The substrate 13 is mounted thereon with the luminous element 14. Since the luminous element 14 emits light in an upper direction from the substrate 13, the upper direction of the luminous element 14 and substrate 13 becomes a light emitting side.

The luminous element 14 is formed of an optical semiconductor device, for example, such as a LED device or an organic EL device or the like.

As shown in FIGS. 3 to 6, to assemble the lamp unit 10, first, the substrate 13 mounted thereon with the luminous element 14 is attached and fixed to a rear side of the housing 11 using fixing members (not shown) such as screws and the like.

Then, the luminous element 14 is arranged at an approximately center of the opening 11a of the housing 11, the luminous element 14 is surrounded the wall portion 11b of the housing 11 and the lower face of the wall portion 11b is in contact with a front face of the substrate 13 on which the luminous element 14 is mounted, thereby apical faces of the protrusions 11e to 11j of the housing 11 are in contact with the front face of the substrate 13.

Next, the lens 12 is attached to the front side (the light emitting side of the luminous element 14) of the housing 11, and the fixing members 12c, 12d of the lens 12 are inserted into the attachment holes 13a, 13b from the attachment holes 11b, 11c of the housing 11.

Then, the wall portions 12e to 12g of the lens 12 are in contact with the front side of the housing 11 to surround the opening 11a of the housing 11.

As a result, the housing 11 is sandwiched between the front face of the substrate 13 and the wall portions 12e to 12g of the lens 12.

Here, the inside diameter of the attachment holes 11b, 11c, 13a, 13b is formed in a size a little larger than the external diameter of the fixing members 12c, 12d thereby the insertion of the fixing members 12c, 12d therein may smoothly be performed.

And, positioning of the luminous element 14 and the lens 12 is performed in a state where an optic axis (direction of light beam irradiation) S of the luminous element 14 and the lens 12 has been adjusted.

As a result, since light emitted from the luminous element 14 is concentrated by the lens body 12a thereby producing a spotlight having a narrow angle of beam spread and the spotlight radiates along the optic axis S, the lamp unit 10 forming a map lamp may illuminate a relatively small area of an interior of a vehicle.

Next, heat is applied to front end portions of the fixing members 12c, 12d of the lens 12 protruding from the attachment holes 13a, 13b of the substrate 13 thereby softening the front end portions thereof, and the lens 12 is fixed with respect to the substrate 13 by heat-coking of the fixing members 12c, 12d, thereby the substrate 13 is sandwiched between the housing 11 and the lens 12 thereby being fixed (not shown).

According to the lamp unit 10 of the preferred embodiment of the present invention, the following action and effect may be obtained.

(1) The lamp unit 10 is provided with a substrate 13 mounted thereon with the luminous element 14, the housing 11 having the opening 11a arranged therein with the luminous element 14 and the lens 12 arranged at a light-directed side of the luminous element 14, and the housing 11 is sandwiched between the substrate 13 and the lens 12 to thereby be fixed.

For this reason, the lamp unit 10 according to the present invention does not need a housing of a conventional structure (structure in which a substrate and a lens are covered by a housing having an opening and the lens is exposed from the opening).

The lamp unit 10 is provided with the wall portion 12e protruding from a side (rear face side) of the lens 12 facing the housing 11 to thereby surround the opening 11a of the housing 11, and the wall portion 11d protruding from a side (rear face side) of the housing 11 facing the substrate 13 to thereby surround the opening 11a of the housing 11.

For this reason, the luminous element 14 is received in the receiving space R surrounded by the two wall portions 12e, 11d, lens 12 and substrate 13 (see FIGS. 4 and 5).

Here, the housing 11 is sandwiched between the substrate 13 and the lens 12 to thereby be fixed, thereby the wall portion 12e of the lens 12 and the housing 11 are in contact with each other and the wall portion 11d of the housing 11 and the substrate 13 are in contact with each other, so that these contact portions are adhered closely to each other without any gap.

For this reason, the lamp unit 10 can serve to accurately prevent foreign substances such as dust and the like from invading the receiving space R for the luminous element 14 from the outside thereof.

As a result, the lamp unit 10 can serve to solve the problem that foreign substances are attached to a rear face side of the lens 12 or the luminous element 14 thereby lowering an accuracy in lighting, or the problem that the foreign substances attached to a rear face side of the lens 12 or the luminous element 14 are viewed thereby lowering its visual appearance.

The lamp unit 10 is provided in the map lamp-combined switch apparatus 100 installed on a roof portion of an interior of a vehicle.

According to the preferred embodiment of the present invention, since foreign substances can accurately be prevented from invading the interior (receiving space R) of the lamp unit 10 as described above, the lamp unit 10 which is appropriate for a map lamp may be provided.

(2) Though the luminous element 14 radiates light in a radial direction toward the lens 12 side, since the wall portion 12e of the lens 12 is arranged more outside than the wall portion 12d of the housing 11, there is no concern that a light emission of the luminous element 14 is hindered by the wall portions 12e, 12d thereby enhancing the efficiency of light emission.

(3) The fixing members 12c, 12d protruding from a side (rear face side) of the lens 11 which faces the housing 11 are inserted into the attachment holes 13a, 13b passing through the substrate 13 from the attachment holes 11b, 11c formed to pass through the housing, and the fixing members 12c, 12d and the attachment holes 11b, 11c, 13a, 13b are arranged more outside than the wall portion 12e of the lens 12.

For this reason, the fixing members 12c, 12d are arranged outside the receiving space R of the luminous element 14 thereby the fixing members 12c, 12d do not hinder the action and effect in the above (1) and (2).

Since it is possible that the housing 11 is sandwiched between the substrate 13 and the lens 12 by means of the fixing members 12c, 12d, without using separate members such as screws and the like thereby fixing the housing 11, the fixing members 12c, 12d are formed in a body with the lens 12 thereby reducing the cost of the parts to realize its low cost.

(4) Since it is provided the wall portions 12f, 12g connecting the wall portion 12e of the lens 12 to the fixing members 12c, 12d, stiffness of the lens 12 is enhanced thereby becoming possible to prevent the lens 12 from being deformed, thereby preventing the action and effect of the above (1) from being hindered.

(5) By heat-coking of front end portions of the fixing members 12c, 12d protruding from the attachment holes 13a, 13b of the substrate 13, the lens 12 is fixed with respect to the substrate 13 and the housing 11 is sandwiched between the substrate 13 and the lens 12 to thereby be fixed.

Here, the wall portion 12e of the lens 12 is arranged more outside than the wall portion 11d of the housing 11 (see the above (1)), and the fixing members 12c, 12d and the attachment holes 11b, 11c, 13a, 13b are arranged more outside than the wall portion 12e of the lens 12 (see the above (3)).

For this reason, when the fixing members 12c, 12d are performed with heat-coking, by the principle of a lever having a base portion of each of the fixing members 12c, 12d as a dynamic point, the wall portion 11d of the housing 11 as a supporting point, and the wall portion 12e of the lens 12 as an action point, a force pressing the wall portion 12e toward the housing 11 is acted thereby enhancing a close adhesion between the wall portion 12e and the housing 11 and at the same time a close adhesion between the wall portion 11d and the substrate 13.

Furthermore, by the relationships in positions of the fixing members 12c, 12d, the wall portions 11d, 12e, as indicated by the arrow α show in FIG. 4, a force causing the fixing members 2c, 12d to be bent in an inside direction of the lens 12 (a direction of optical axis S) is acted thereby further enhancing a close adhesion there-between. As a result, the action and effect according to the above (1) can accurately be obtained.

Since the lens 12 is provided with the wall portions 12f, 12g (see the above (4)), even though a force causing the fixing members 12c, 12d to be bent inward the lens 12, an excessive deformation in the whole lens 12 may be prevented.

(6) Since the light diffusion processing has been performed with respect to the surface 12h of the lens 12, unevenness in color of light emitted from the surface 12h of the lens 12 may be reduced, thereby enhancing the degree of accuracy in the lighting.

Here, there is no need to perform the light diffusion processing with respect to the entire surface 12h of the lens 12, but it is preferable to perform the optical diffusion processing with respect to only the surface from which light of the luminous element 14 radiates.

The detailed method of light diffusion processing may include, for example, a method of performing blasting treatment or graining treatment or the like on the surface 12h of the lens 12, or a method of arranging a sheet containing light diffusion agents on the surface 12h of the lens 12, or the like.

Incidentally, the light diffusion agents include glass particles having refractive indexes different from that of the lens 12, or silicon oxide, or titanium oxide, or transparent or white particles.

The present invention is not limited to the foregoing aspects and embodiments. It will be appreciated by those skilled in the art that various modification aspects may be made in these embodiments without departing from the principles and spirit of the invention, the scope of which is defined in the appended claims and their equivalents. The entire contents of theses, publications, patents, etc having been described in the description of the invention are incorporated herein by reference.

What is claimed is:

1. A lamp unit, comprising:
a substrate on which a luminous element is mounted;
a housing having an opening in which the luminous element is arranged; and
a lens arranged at a light emitting side of the luminous element,
wherein the housing is sandwiched and fixed between the substrate and the lens, and
wherein the lens is provided with a first wall portion protruding from a side of the lens facing the housing and surrounding the opening of the housing, and the housing is provided with a second wall portion protruding from a side of the housing facing the substrate and surrounding the opening of the housing, the second wall portion contacting the substrate,
the lamp unit further comprising:
a fixing member protruding from a side of the lens facing the housing, wherein the fixing member is arranged outside the first wall portion.

2. A lamp unit, comprising:
a substrate on which a luminous element is mounted;
a housing having an opening in which the luminous element is arranged; and
a lens arranged at a light emitting side of the luminous element,
wherein the housing is sandwiched and fixed between the substrate and the lens, and
wherein the lens is provided with a first wall portion protruding from a side of the lens facing the housing and surrounding the opening of the housing, and the housing is provided with a second wall portion protruding from a side of the housing facing the substrate and surrounding the opening of the housing, the second wall portion contacting the substrate,
wherein the first wall portion includes a ring portion provided on a side of the first wall portion facing the housing, and
wherein the ring portion contacts the housing.

3. The lamp unit of claim 2, wherein the ring portion is arranged outside the second wall portion.

4. The lamp unit of claim 2, wherein an inner diameter of the ring portion is arranged outside a lens body of the lens.

* * * * *